Jan. 12, 1943. H. J. CRABBS 2,307,919
CROWN CASTELLATED NUT
Filed June 28, 1940
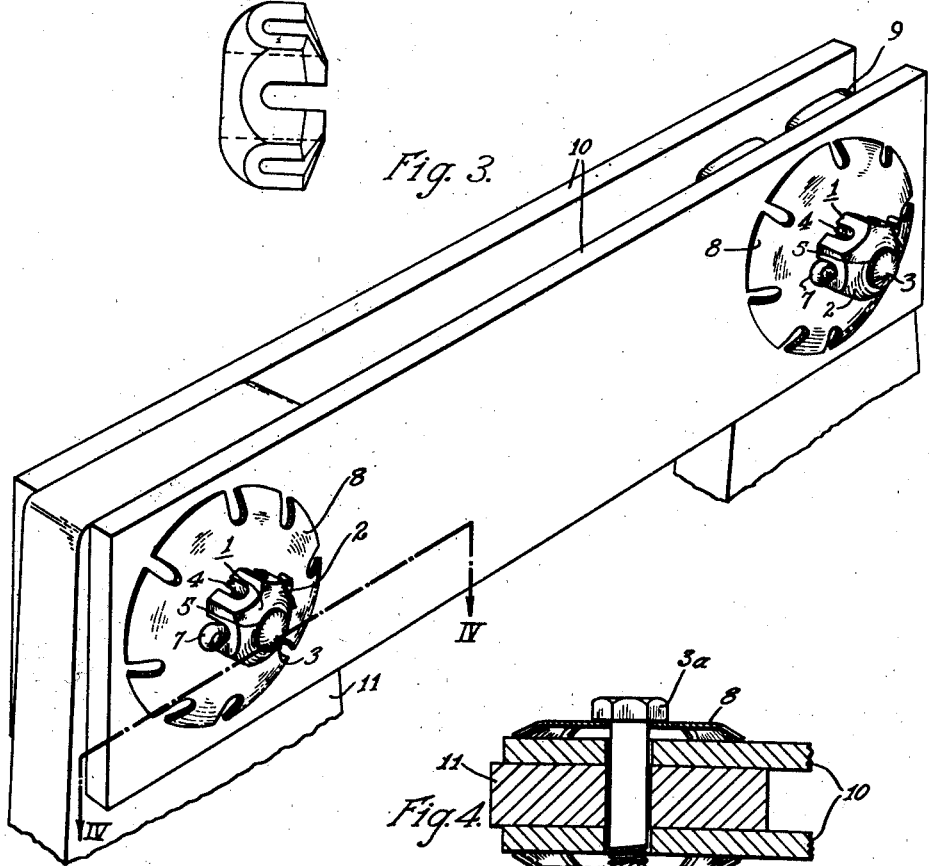
INVENTOR
Herbert J. Crabbs
BY
Paul E. Friedemann
ATTORNEY Patented Jan. 12, 1943

2,307,919

UNITED STATES PATENT OFFICE 2,307,919

CROWN CASTELLATED NUT

Herbert J. Crabbs, Wilkinsburg, Pa., assignor to Westinghouse Electric & Manufacturing Company, East Pittsburgh, Pa., a corporation of Pennsylvania Application June 28, 1940, Serial No. 342,936

1 Claim. (Cl. 151—19)

My invention relates to a novel form of castellated nut which is for general application, but which is particularly suited, in conjunction with a resilient washer, to form means for maintaining substantially constant pressure between a pair of electrical contacts, such, for example, as are contained in a disconnecting switch.

My invention is also directed to a novel and inexpensive method of making a crown castellated nut.

I am fully aware that castellated nuts are quite well known in the art. However, the well known form of castellated nut has its castellations or diametrical grooves on the upper side thereof, whereas the lower side, that is the side which first contacts the bolt, is generally smooth and forms a continuous annular surface. There are many objections to this type of nut. One outstanding objection to it is that it presents a very irregular surface with sharp edges which are dangerous and apt to cause injuries to the workman who may accidentally brush over the same or oftimes when he manipulates the nut to loosen or tighten the same. Another outstanding objection is that with the castellations at the upper surface the cotter pin which goes through a hole in the bolt projects unduly towards the workman, hence affording another source of possible injury due to the projection of the sharp edges of the cotter pin.

Furthermore, another objection is that the well known type of castellated nut must usually be made by an automatic screw machine and is not readily made, as is my castellated nut, by stamping, stamping being a comparatively inexpensive method of manufacture. Still another objection to the well known form of castellated nut is that it does not always provide a positive locking action if it should so happen that the nut has been screwed in too far. Still another objection is that a relatively long bolt must be used.

In accordance with my invention, all the above-stated disadvantages have been eliminated as will appear more clearly hereinafter.

An object of my invention is to provide a novel type of castellated nut which is simple in construction, inexpensive to manufacture, and which is extremely efficient as a locking means, providing a positive locking action when used in conjunction with a cotter pin and a bolt.

Another object of my invention is to provide a novel form of castellated nut which not only provides a better appearance than the well known type of castellated nut, but which is devoid of outstanding sharp edges and projections, and outstanding projections of the cotter pin used therewith, so that it is much safer from the standpoint of the workman who must manually handle, screw, and unscrew such nut or operate the machine elements provided with my nut.

Another object of my invention is to provide a novel and inexpensive method of stamping of a flat sheet metal piece to form a crown shaped castellated nut.

Other objects and advantages will become more apparent from a study of the following specification when considered in conjunction with the acocmpanying drawing, in which:

Figure 1 is a side view of a crown castellated nut in accordance with my invention;

Fig. 2 is a bottom view of a nut shown in Fig. 1;

Fig. 3 is a perspective view of a disconnecting switch showing an application of my novel form of nut together with a resilient cup washer;

Fig. 4 is a cross sectional view taken along line IV—IV of Fig. 3 and which shows the bolt end assembly in partial cross section; and Fig. 5 is a side view of a modification of the nut shown in Fig. 1.

Referring more particularly to Figs. 1, 2 and 4, numeral 1 denotes, generally, the novel form of castellated nut which is substantially crown shaped.

The upper surface thereof has an uninterrupted annular portion of substantially arcuate cross section as denoted by numeral 2. The lower portion, that is, the portion which first engages a bolt such as bolt 3, as shown in Fig. 4, is castellated, that is, has a plurality of diametric slots 4. I prefer to make the depth of these slots greater than half the total depth or total height of the nut. A threaded hole or tap 5 is provided which extends from the top portion to the bottom portion of nut 1 and through which the threaded bolt 3 forms a threaded engagement. A plurality of outstanding lugs 6 having arcuate outer surfaces are provided, as shown in Fig. 2, which together form an interrupted circular pattern, thereby avoiding damage which would otherwise ensue onto the adjoining washer or other engaging part which would be present if sharp edges were present. While the bolt is shown as having a rigid head portion 3a, such head portion may equally be in the form of a second nut screwed onto a stud.

If a greater locking action of the nut on the bolt threads is desired, lugs 6 are frusto-conically tapered as shown in Fig. 5, instead of being flat at the bottom. The taper is illustrated by the lines A—A of Fig. 1, which lines intersect at the axis of the nut. If the surface against which these lugs finally abut is similarly tapered a wedging action will be effected, causing the prongs of the nut to yield inwardly and tightly grip the threads of the bolt. A similar effect can be had if the adjoining surface, whether it be washer 8 or not, has an enlarged hole along the perimeter of which lugs 6 will wedge and effect a binding action on the threads of the nut. Such tapered lower surface of the nut may be used either in addition to or as a substitute for the cotter pin. As a substitute, however, the insurance against insufficient tightening of the nut by the workman by mere observation of a supervisor is lost.

One outstanding difference that nut 1 has with respect to the well known type of castellated nut is that it is reversely slotted or that the castellations are on the reverse side, that is, on the lower side. By the lower end I mean the end which first engages a bolt as the nut is screwed thereon. Furthermore, in so assembling the nut in conjunction with a cotter pin 7 and a flexible cup washer 8 as shown in Figs. 3 and 4, a smooth uninterrupted annular portion 2 of arcuate cross section is presented which not only greatly improves the appearance of the nut and cotter pin assembly but adds greatly to the safety of the assembly for it does not provide sharp outstanding edges as were provided in the standard form of castellated nut, and substantially conceals and places the cotter pin at a more remote distance from the outstanding surface than is provided by the well known form of castellated nut in which the cotter pin normally projects from the outer or upper end surface of the nut.

In view of my novel form of castellated nut, which in its finished form is substantially crown-shaped or hemispherically shaped, it lends itself to simple manufacturing methods. For example, instead of making it by an automatic screw machine, it may also be made by forging or, better still, by stamping from a sheet metal. For example, a flat sheet metal or blank which is substantially disc-shaped but which has outstanding radial lugs or spokes may be pressed into the form of a crown with castellations by a suitable die and thereafter the threaded tap or hole may be provided on such a crown-shaped blank. This method of manufacture is extremely simple and relatively inexpensive, particularly for large quantity production.

Figs. 3 and 4 show an application of my improved crown-shaped castellated nut on a disconnecting switch having a stationary break tongue 9 and a pair of blades 10 which are hinged on a hinge tongue 11. It will be readily apparent in assembly of this structure that the nut 1 is screwed onto bolt 3, until a slight deformation of cup washer 8 is screwed, at which time the cotter pin 7 is placed through one of the diametric grooves 4, which will be in registry with the diametric hole or groove 12 in the bolt. It will be readily apparent that the hole 12 may either be in the form of a circular hole as would be made by drilling, or could instead be longitudinally slotted to allow greater freedom in the longitudinal placement of the cotter pin 7.

By making the slot depth appreciable in comparison with the nut thickness or height, preferably greater than half the total thickness or height of the nut, a greater variation in the location of the cotter hole in the bolt is secured. In an actual form of my nut a 20% less height and a 40% deeper slot was used as compared to comparable standard castellated nuts. Also, there is a greater variation in the thickness and deflection of the spring cup washer 8 used for delivering contact pressure. Since the assembly for affording contact pressure in Fig. 3 is impressed with an electrical potential, it is preferable to make each of the elements 1, 3, 7 and 8 of a non-corrosive metal, such as a copper alloy, instead of the conventional steel which is corrosive.

From a study of my novel form of nut and nut assembly, it will be readily apparent that it provides the following advantages over the well known type of castellated nut assembly:

(A) It is less expensive to make and simpler in form and can be made not only by an automatic screw machine but by forging or stamping from sheet metal as well.

(B) It is devoid of the possibility of injury to the workman inasmuch as there are no exposed sharp corners and since the cotter pin is well away from the most outstanding outer surface and likewise does not provide outstanding sharp edges. Furthermore, the workman readily manipulates the same without injury to his fingers because of the outstanding smooth annular surface of arcuate cross section. Furthermore, it gives a much more finished and attractive appearance than the ordinary castellated nut.

(C) It is impossible to locate the cotter hole so that the cotter pin does not properly engage and lock the nut in the event of excessive screwing down of the nut which is not the case with the well known castellated nut. In the latter instance there is a separation between the castellated surface of the nut and the cotter pin. This eliminates the possibility of complete assembly without positive locking, for the most that could happen with my assembly in the event that the cotter hole were not deep enough would be that it would be covered by the nut, therefore making it impossible to complete the assembly without remedying the fault. The omission would be readily noted by an inspector or other supervisor.

(D) It permits using a shorter bolt in many cases, inasmuch as the cotter hole is back further from the end of the bolt. In other words, there need be no projection of the bolt from the upper surface of the nut as is required in well known castellated nut assemblies. In fact, the bolt need not project at all and may be contained within the upper suface of my improved form of castellated nut. Therefore, it avoids the necessity of a long bolt and effects a saving in material.

(E) If the nut as shown in Fig. 3 is always tightened against the flexible member, such as a spring cup washer, there is no danger of deformation due to its reversed slotted structure.

(F) Since the nut thickness is 20% less and the slot depth 40% greater than the well known form of castellated nut, this permits greater variation in the location of the cotter hole in the bolt and greater variation in the thickness and deflection of the spring cup washer used for delivering contact pressure.

(G) With my nut there is also no danger to clothing of an attendant operating an electric switch, for example, provided with a nut.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claim and such prior art that may be pertinent.

I claim as my invention:

A nut comprising a body member having a threaded opening extending axially therethrough for engagement with a threaded bolt, the end portion of said body member adapted to have initial threaded engagement with said bolt being substantially castellated the suface of said castellated end portion extending radially outwardly defining segments of a frustrum of a cone for effecting locking action on the bolt when driven home.

HERBERT J. CRABBS.